July 2, 1929.  P. H. BUEHRLE  1,719,689
GRINDING ATTACHMENT FOR LATHES
Filed July 2, 1927   3 Sheets-Sheet 1
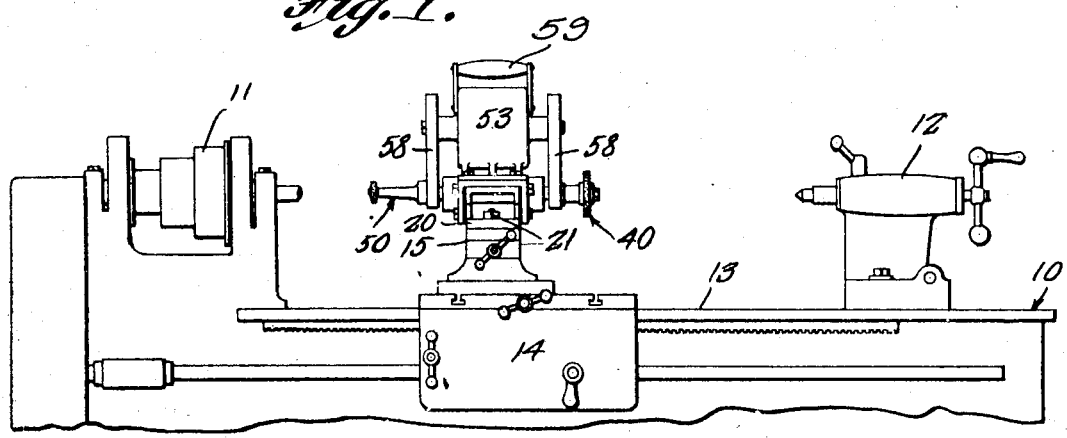
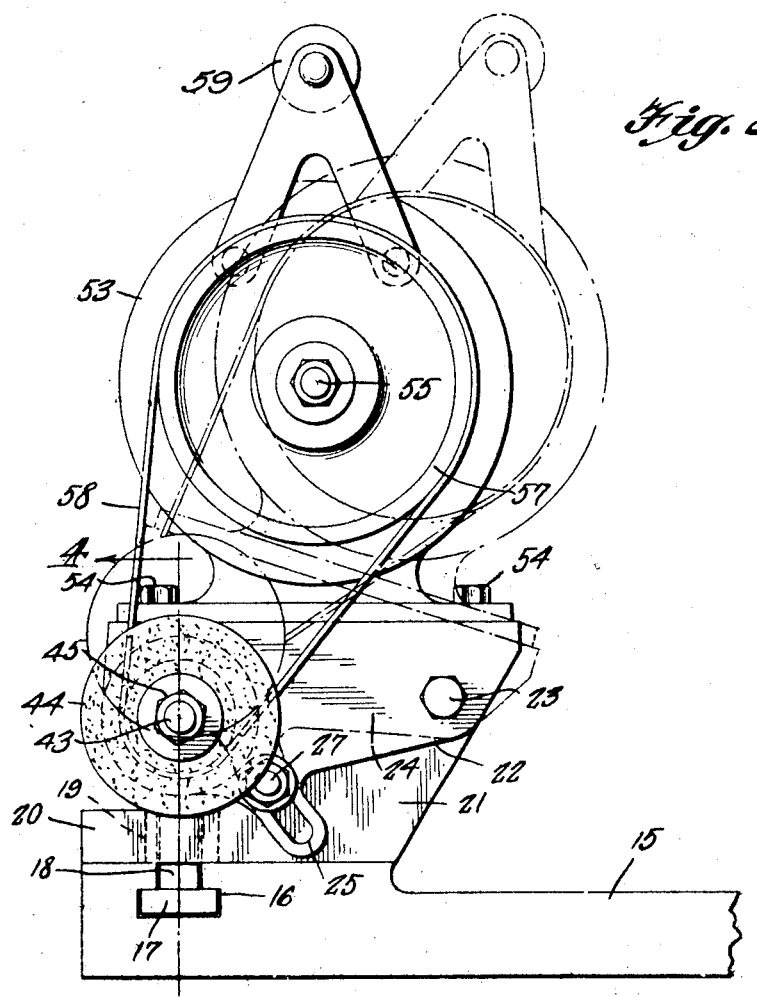
Philip H. Buehrle,
INVENTOR Philip H. Buehrle, INVENTOR BY Victor J. Evans ATTORNEY P. J. Hickey. WITNESS July 2, 1929.  P. H. BUEHRLE  1,719,689
GRINDING ATTACHMENT FOR LATHES
Filed July 2, 1927   3 Sheets-Sheet 3
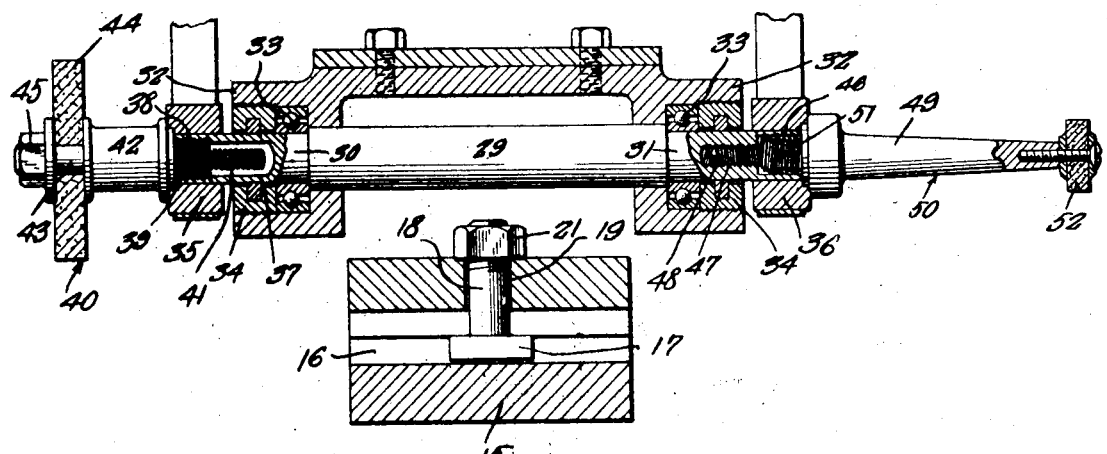
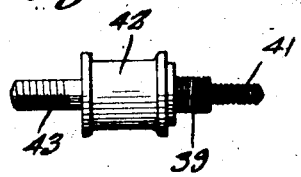
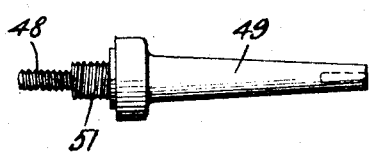
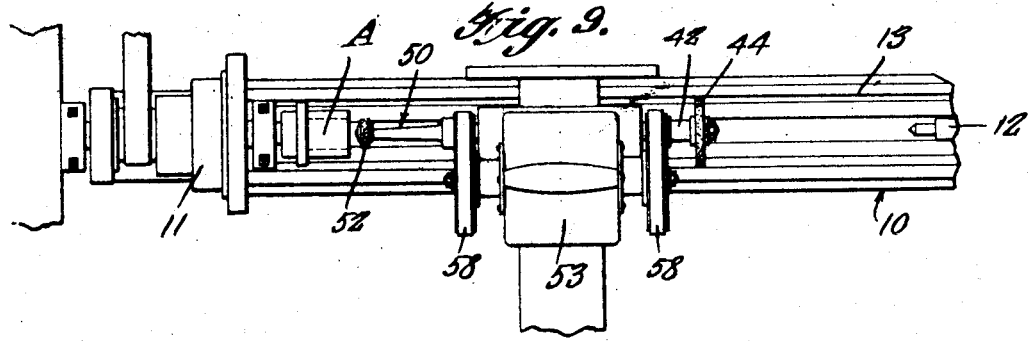
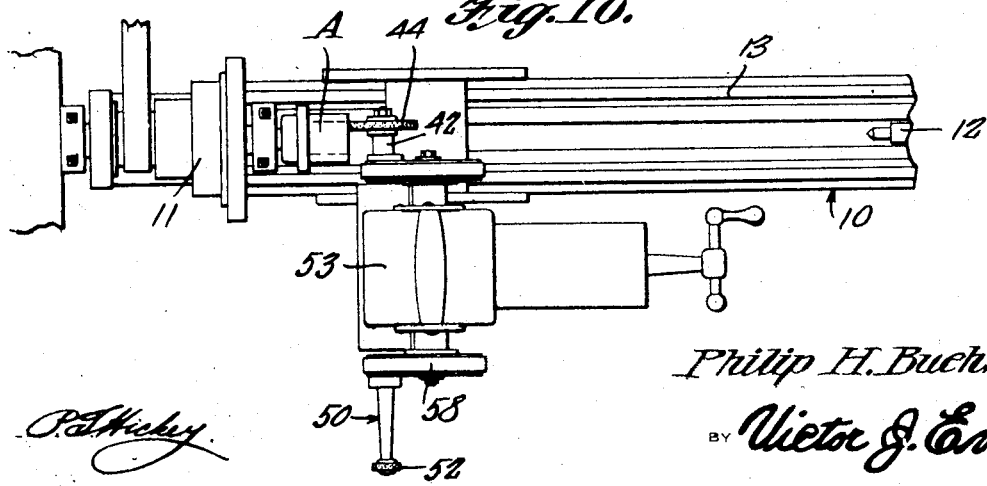
Philip H. Buehrle, INVENTOR
WITNESS:

Patented July 2, 1929.

1,719,689

UNITED STATES PATENT OFFICE.

PHILIP H. BUEHRLE, OF SPOTTSWOOD, NEW JERSEY.

GRINDING ATTACHMENT FOR LATHES.

Application filed July 2, 1927. Serial No. 203,182.

This invention relates to lathe grinding machines.

The primary object of the invention resides in the provision of a grinding machine for attachment to the compound slide rest of a lathe and by which the internal and external surfaces of a piece of work may be ground while held in the chuck of the head stock upon the easy manipulation of the machine to various positions of adjustment.

Another object of the invention is to provide a grinding machine having a driven rotatable shaft which carries detachable grinding elements at opposite ends thereof and which are interchangeable with respect to each other to facilitate the reversal of different size grinding elements.

A further object of the invention is the provision of a grinding machine which is mounted on the compound slide of a lathe in a manner so as to be swung to various grinding positions not heretofore possible in prior machines of the nature.

A still further object of the invention is to provide a lathe grinding machine in which the axis of the grinding wheels are normally disposed in alignment with the axis of the head and tail stock of a lathe to permit of the internal grinding on a piece of work supported in the lathe.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a side elevation of a portion of a lathe with my improved grinding machine in position thereon.

Figure 2 is an enlarged end elevation of the grinding machine.

Figure 4 is a vertical sectional view on the line 4—4 of Figure 2.

Figure 7 is a side elevation of one of the mandrels.

Figure 8 is a similar view of the other of the mandrels.

Figure 9 is a top plan view of my grinding machine in position on a lathe and in an adjusted position for internal grinding.

Figure 10 is a similar view with the grinding machine adjusted for external grinding.

Figure 3:
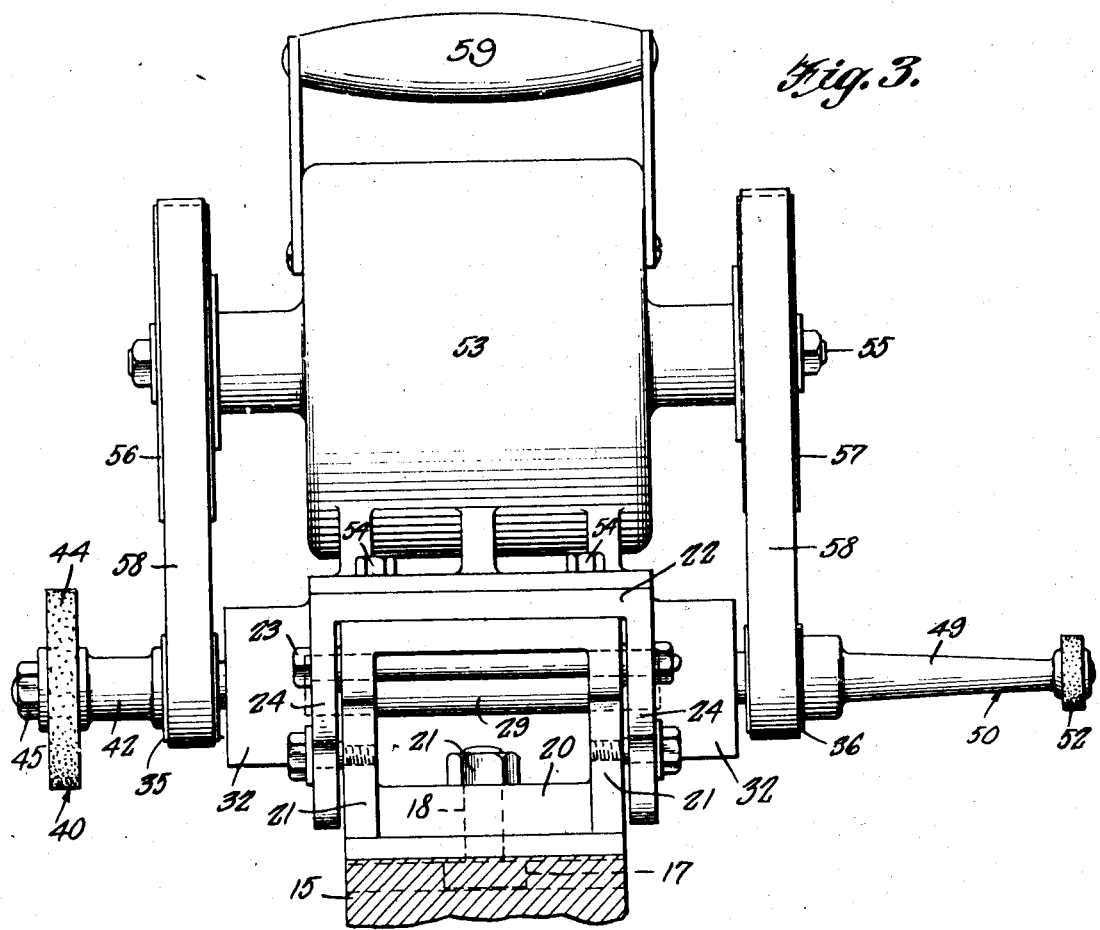
Figure 3 is a front elevation of the grinding machine.
Figure 5:
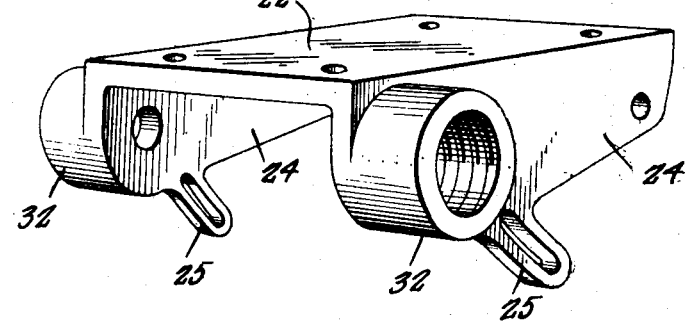
Figure 5 is a detail perspective view of the motor supporting yoke.
Figure 6:
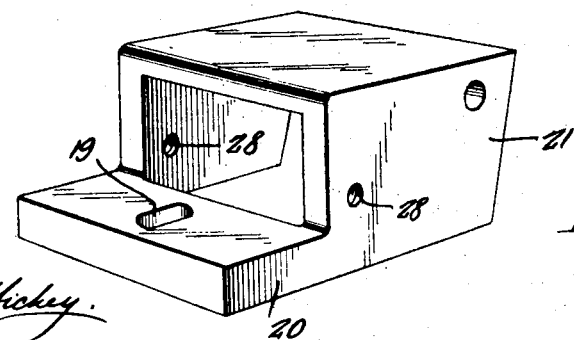
Figure 6 is a detail perspective view of the base or carriage.

Referring to the several figures of the drawings by reference characters, the numeral 10 designates a lathe having a head stock 11, tail stock 12, bed 13 over which the carriage 14 is longitudinally slidable, and which carriage supports the usual compound slide 15 provided with the usual inverted T-shaped slot 16 extending transversely thereof. Instead of receiving the usual tool holder, the slot 16 receives the head 17 of a threaded bolt 18 which passes upwardly through a slot 19 provided in a flange 20 of a base member 21. A nut 21 co-acts with the threads on the free end of the bolt 18 to clamp the base member in various positions of adjustment.

Pivoted to the base member 21 is a yoke or inverted U-shape saddle 22, the pivot bolts 23 of which pass through openings in the downwardly extending flanges 24 which straddle the sides of the base member 21. Arcuate shape slots 25 are provided in the side flanges 24 for the passage of clamping bolts 27 which thread into openings 28 in the base member 21, and by which the yoke member may be held in adjusted position when swung about the pivot bolts 23.

Journalled within the flanges 24 is a driven shaft 29 having reduced ends 30 and 31 respectively which extend beyond annular flanges 32 projecting onwardly from the side flanges 24 of the yoke member. Roller bearings 33 are seated within the annular flanges 32 about the reduced ends of the driven shaft and are held seated by caps 34 threaded into the outer ends of the annular flanges. Fixed to the outer ends 30 and 31 of the driven shaft 29 are pulleys 35 and 36 respectively, for a purpose to be presently explained.

The outer end 30 of the driven shaft 29 is provided with a socket 37, the outer interior walls of which are provided with left hand screw threads 38 for normally receiving the left hand threaded shank 39 of an external grinding element 40. The shank 39 is reduced in diameter to provide a reduced right hand threaded portion 41 which is freely disposed within the socket 37 but which is used for a purpose hereinafter explained. A spacing collar 42 is provided between the threaded shank 38 and the spindle 43 on which an external grinding wheel 44 is removably mounted by a nut 45.

The reduced end 31 of the driven shaft 29 is provided with an outer smooth socket 46 and a reduced internally threaded recess 47, the threads of which are right hand for receiving the right hand thread on the reduced end 48 of a spindle 49 of a grinding element 50. The spindle adjacent the threaded end 48 is enlarged in diameter and is provided with left hand screw threads 51 which is disposed in the smooth socket 46. The right hand threaded shank 41 of the grinding element 40 and the reduced shank 48 of the grinding element 50 are of the same diameter for interchangeably screwing into the threaded recess 47 depending upon which end of the shaft is most convenient to receive the respective grinding elements. Likewise, the left hand threaded portions 39 and 51 are of the same diameter for interchangeably screwing into the threaded portion 38 of the reduced end 30 of the driven shaft. By this arrangement the two grinding elements 40 and 50 may be interchanged, depending upon the nature of work being performed. A grinding wheel 52 is removably mounted on the outer end of the spindle 49, but is of a smaller diameter than the wheel 44 and is especially used for internal grinding purposes, while the wheel 40 is used for external grinding.

For the purpose of imparting rotation to the driven shaft 29, I employ an electric motor 53, the base of which is bolted to the top of the yoke 22 as at 54. The ends of the motor shaft 55 extend beyond the sides of the motor casing and have pulley wheels 56 and 57 which are disposed in alignment with the respective pulleys 35 and 36 to receive driving belts 58. A handle 59 is provided on the top of the motor by which the same may be swung to a position to cause the grinding elements to engage the work held in the chuck of the head stock 11.

In the use of the grinding machine, the same is movable with the compound slide 15, as it is fixedly bolted thereto by the bolt 18 and retaining nut 21. In Figure 9 of the drawings, I have shown one particular position of the machine, whereupon the compound slide is disposed at right angle to the length of the lathe. When in this position, the axis of the driven shaft 29 is in alignment with the axis of the head and tail stock so that the grinding wheel 52 may be moved into the open end of a piece of work A held by the head stock 11, by sliding the compound slide over the bed rest 13. The grinding wheel may be moved into engagement with the interior walls of the work by tilting the motor and its support on the pivot 23 as shown in dotted lines in Figure 2 of the drawings. Should it be desired to maintain the same in a grinding position, the clamping nuts 27 are tightened. In the event that the axis of the driven shaft is not exactly in alignment with the axis of the head and tail stocks the base member 18 may be shifted slightly due to the slot 19 to bring the same into proper alignment.

Should it be desired to grind the external surfaces of the piece of work A, the compound slide is moved to the position as shown in Figure 10 of the drawings, whereupon the motor base is disposed parallel to the length of the bed of the lathe, with the carriage 14 adjusted to cause the external grinding wheel 44 to engage the exterior of the work, either at the end of the piece of work or the sides thereof.

By the construction of a grinding machine of the kind herein set forth, it is possible to adjust the machine to meet all grinding conditions and one in which the adjustments may be made both rapidly and accurately.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In combination with the compound slide of a lathe, a base member fixed to said compound slide, a motor support pivoted to said base member, a driven rotatable shaft journalled in opposed bearings in said motor support, an electric motor mounted on said motor support, aligned pulley wheels mounted on said driven rotatable shaft and the drive shaft of said electric motor, a belt passing over said aligned pulleys, and a handle member on said motor by which the same and said motor support may be tilted about the pivot point of the latter.

2. A grinding machine for lathes comprising a base member adapted to be fixedly mounted to the compound slide of a lathe, a saddle member pivoted to said base member, a driven rotatable shaft journalled in said saddle member, clamping means for holding said saddle member in an adjusted position about its pivotal connection, an electric motor mounted on said saddle member, aligned pulleys mounted on said driven rotatable shafts and the drive shaft of said electric motor, a belt passing over said aligned pulleys, and a handle member on said electric motor by which it may be manually tilted upon the release of said clamping means.

3. In combination with the compound slide of a lathe, a base member bolted to said compound slide, an inverted U-shape saddle member pivoted to said base member and straddling the same, aligned bearings in said saddle member, a driven rotatable shaft journalled in said bearings, the sides of said saddle member having aligned arcuate slots, threaded studs carried by the sides of said base member passing through the respective arcuate shaped slots, and clamping nuts threaded to said threaded studs for holding said saddle member in position of pivotal adjustment, said saddle member adapted to support an electric motor from which power is produced for imparting rotation to said driven rotatable shaft.

In testimony whereof I have affixed my signature.

PHILIP H. BUEHRLE.